(12) United States Patent
Yoon (10) Patent No.: US 11,619,698 B2
(45) Date of Patent: Apr. 4, 2023

(54) METHOD AND TERMINAL FOR CONTROLLING POWER PLANT

(71) Applicant: KEPCO ENGINEERING & CONSTRUCTION COMPANY, INC., Gimcheon-si (KR)

(72) Inventor: Chang Sun Yoon, Gwangmyeong-si (KR)

(73) Assignee: KEPCO ENGINEERING & CONSTRUCTION COMPANY, INC., Gyeongsangbuk-do (KR)

( * ) Notice: Subject to any disclaimer, the term of this patent is extended or adjusted under 35 U.S.C. 154(b) by 470 days.

(21) Appl. No.: 16/687,748

(22) Filed: Nov. 19, 2019

(65) Prior Publication Data

US 2020/0191897 A1    Jun. 18, 2020

(30) Foreign Application Priority Data

Dec. 14, 2018   (KR) .......................... 10-2018-0162143

(51) Int. Cl.

| G06V 20/20 | (2022.01) |
| G01S 1/04 | (2006.01) |
| G06V 20/64 | (2022.01) |
| G01K 13/02 | (2021.01) |
| G06Q 50/06 | (2012.01) |

(52) U.S. Cl.
CPC ............ *G01S 1/0428* (2019.08); *G06V 20/20* (2022.01); *G06V 20/64* (2022.01); *G01K 13/02* (2013.01); *G06Q 50/06* (2013.01)

(58) Field of Classification Search
CPC ...... G01S 5/0295; G01S 1/0428; G06F 16/29; H04W 64/00; H04W 4/029
See application file for complete search history.

(56) References Cited

U.S. PATENT DOCUMENTS

| 9,635,510 | B1* | 4/2017 | Chun-Nan | ............ H04W 4/026 |
| 10,405,147 | B1* | 9/2019 | Mahmoud | ............... H04W 4/80 |
| 2011/0238735 | A1* | 9/2011 | Gharpure | ................ G06F 16/29 |
| | | | | 707/802 |
| 2015/0339948 | A1* | 11/2015 | Wood | ..................... G02B 1/048 |
| | | | | 434/219 |

(Continued)

FOREIGN PATENT DOCUMENTS

| KR | 10-2015-0094132 | 8/2015 |
| KR | 10-1815781 | 1/2018 |

(Continued)

OTHER PUBLICATIONS

Korean Office Action 10-2018-0162143 dated Dec. 14, 2018.

*Primary Examiner* — Vincent H Tran (74) *Attorney, Agent, or Firm* — Nixon Peabody LLP; Jeffrey L. Costelia (57) ABSTRACT

A power plant controlling method includes: receiving a beacon signal from a location beacon or a device information beacon, wherein the location beacon is mounted in a region of a power plant area requiring monitoring and controlling, the region including an employee circulation path, and the device information beacon is mounted at a device requiring identification; tracking a location of the beacon that transmitted the received beacon signal; and receiving information about devices within a radius set by a user based on the tracked location.

11 Claims, 11 Drawing Sheets

(56) References Cited

U.S. PATENT DOCUMENTS

| | | | |
|---|---|---|---|
| 2015/0379441 A1* | 12/2015 | Syed | G16H 40/40 |
| | | | 705/2 |
| 2016/0019737 A1* | 1/2016 | Stagg | H04W 4/023 |
| | | | 340/5.61 |
| 2016/0284073 A1* | 9/2016 | Michalscheck | G06T 7/001 |
| 2017/0019264 A1* | 1/2017 | Nugent | H04W 4/80 |
| 2017/0180925 A1* | 6/2017 | Taylor | G01S 1/042 |
| 2017/0230378 A1* | 8/2017 | Bliss | H04W 4/80 |
| 2017/0248428 A1* | 8/2017 | Cho | H04W 4/026 |
| 2017/0277920 A1* | 9/2017 | DeYoung | G05B 19/418 |
| 2017/0300040 A1* | 10/2017 | Butler | E02F 9/2025 |
| 2017/0316658 A1* | 11/2017 | Lee | H04L 12/1895 |
| 2017/0336210 A1* | 11/2017 | Rahman | H04W 4/33 |
| 2018/0077546 A1* | 3/2018 | Arunachalam | H04W 4/30 |
| 2018/0089870 A1* | 3/2018 | Billi-Duran | G06F 3/011 |
| 2018/0129276 A1* | 5/2018 | Nguyen | G09B 9/00 |
| 2019/0114816 A1* | 4/2019 | Tham | H04B 10/114 |
| 2019/0156105 A1 | 5/2019 | Kim et al. | |
| 2019/0208392 A1* | 7/2019 | Merjanian | G01C 21/3697 |
| 2020/0011696 A1* | 1/2020 | Vijayakumari Mahasenan | |
| | | | G01C 21/3697 |
| 2020/0082325 A1* | 3/2020 | Wylie | H04W 4/029 |
| 2020/0151450 A1* | 5/2020 | Hishinuma | G06T 7/70 |
| 2020/0175765 A1* | 6/2020 | McAdam | G06T 7/74 |
| 2020/0352008 A1* | 11/2020 | Chan | F21S 9/022 |

FOREIGN PATENT DOCUMENTS

| | | | | |
|---|---|---|---|---|
| KR | 10-1870961 | | 7/2018 | |
| WO | WO-2013108043 A2 * | | 7/2013 | G01S 5/0242 |

* cited by examiner

EXAMPLE OF SIMULTANEOUS AR DISPLAY OF DEVICE INTERNAL DATA — 510

FIG. 6

EXAMPLE OF DISPLAYING INFORMATION OF MEASURING DEVICE IN CLOSED CABINET

FIG. 7

EXAMPLE OF DISPLAYING POWER PLANT PROCESS RATE

FIG. 8

EXAMPLE OF QR CODE BASED SIMULTANEOUS AR DISPLAY OF OUTDOOR TANK

FIG. 9

EXAMPLE OF SIMULTANEOUS AR DISPLAY OF PROCESS INFORMATION GRAPHICS IN POWER BLOCK

METHOD AND TERMINAL FOR CONTROLLING POWER PLANT

CROSS-REFERENCE TO RELATED APPLICATION

This application claims the benefit of Korean Patent Application No. 10-2018-0162143, filed on Dec. 14, 2018, in the Korean Intellectual Property Office, the disclosure of which is incorporated herein in its entirety by reference.

BACKGROUND

1. Field

One or more embodiments relate to a total power plant monitoring and controlling system using beacons. More particularly, one or more embodiments relate to a system for tracking a location of a user or a device by using a beacon or a QR code and providing information related to machines in a power plant at the tracked location via augmented reality (AR).

2. Description of Related Art

Use of locating-based information technology (IT) devices has been continually demanded in the previous power generation industries. However, due to the characteristics of the industries, location tracking via a global positioning system (GPS) is not possible in an environment full of iron devices mounted indoors. In particular, it is impossible to use the GPS in a space, such as a power block, which is not open and is surrounded by steel beams and various machines. Thus, GPS-based digital devices cannot be used in the plant industries.

As a result, in the previous plant sites, the positions of various machines and measuring devices are identified with the naked eye. Work operations in a plant under construction or a plant under operation depend on drawings and experiences.

PRIOR ART DOCUMENTS

Patent Documents (Patent document 1) KR 10-1870961 B1

SUMMARY

One or more embodiments aim to resolve the shortcoming of global positioning system (GPS)-based augmented reality (AR), which cannot be used in a power block of a power plant.

One or more embodiments provide a total monitoring and controlling system for precise locating even in a region full of iron metals and for providing AR information in real time.

Additional aspects will be set forth in part in the description which follows and, in part, will be apparent from the description, or may be learned by practice of the presented embodiments of the disclosure.

According to one or more embodiments, a power plant controlling method includes: receiving a beacon signal from a location beacon or a device information beacon, wherein the location beacon is mounted in a region of a power plant area requiring monitoring and controlling, the region including an employee circulation path, and the device information beacon is mounted at a device requiring identification; tracking a location of the beacon transmitting the received beacon signal; and receiving information about devices within a radius set by a user based on the tracked location.

The receiving of the information may include: receiving the information about the devices within the radius set by the ser, in real time, wherein the information is displayed on a terminal of the user via augmented reality (AR), and information received from the beacon signal received from the device information beacon includes consumable replacement request information.

The location beacon may be used for identifying a location and may have unique identification information, wherein the unique identification information includes information of a code indicating a location of a building in the power plant.

The device information beacon may include identification information about a device, and information about a state, a history, or maintenance plan of the device, wherein the information about the maintenance plan of the device further includes consumable replacement information.

The receiving of the beacon signal may include receiving information about a QR code captured in the power plant area requiring monitoring and controlling. A location at which the QR code is captured may be regarded as a location of a user and the information about the devices within the radius set by the user, based on the regarded location of the user, may be received via AR.

According to one or more embodiments, a power plant controlling method includes: arranging a location beacon or a QR code in a region of a power plant area requiring monitoring and controlling, the region including an employee circulation path; arranging a device information beacon at a device requiring identification in the power plant area requiring monitoring and controlling; generating locations at which the location beacon, the QR code, and the device information beacon are arranged as codes; tracking a location of a user based on information received from at least one of the location beacon, the QR code, and the device information beacon; and receiving, via a terminal, information about devices within a radius set by the user based on the tracked location, via augmented reality (AR), wherein the codes include information about a type of a view, information about elevations of the locations at which the location beacon, the QR code, and the device information beacon are arranged, and information about directions in which the location beacon, the QR code, and the device information beacon are arranged, based on the user.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 1:
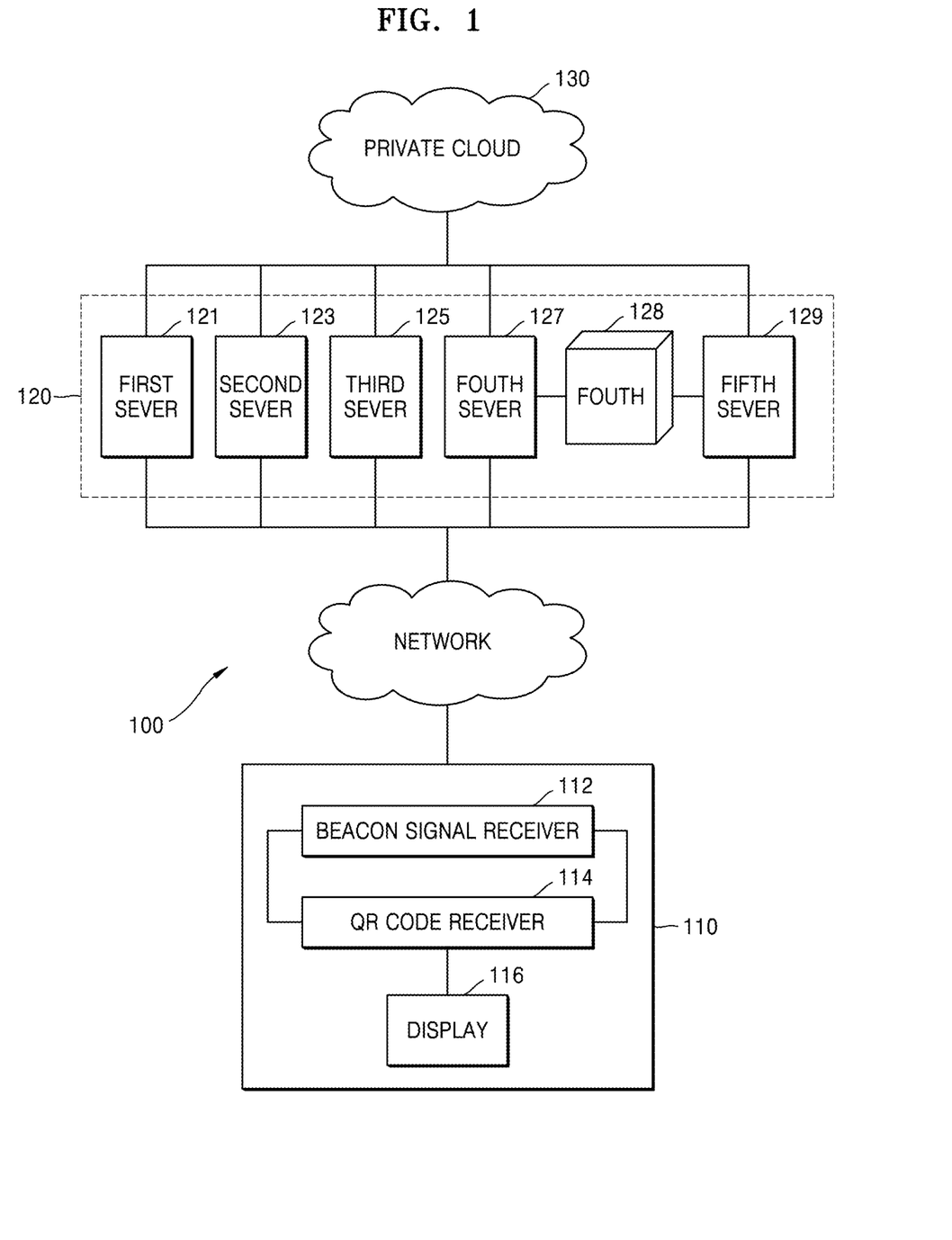
FIG. 1 is a structural diagram of a power plant controlling system using a beacon signal according to an exemplary embodiment of the disclosure.

FIG. 1 is a structural diagram of a total power plant control system 100 using a beacon signal, according to an exemplary embodiment of the disclosure.

The total power plant control system 100 may include a power plant control terminal 110 and at least one server 120 performing network communication. According to an exemplary embodiment of the disclosure, in the total power plant control system 100, a network may be separately established from a wireless network for global positioning system (GPS) signals and smart phones.

Figure 3:
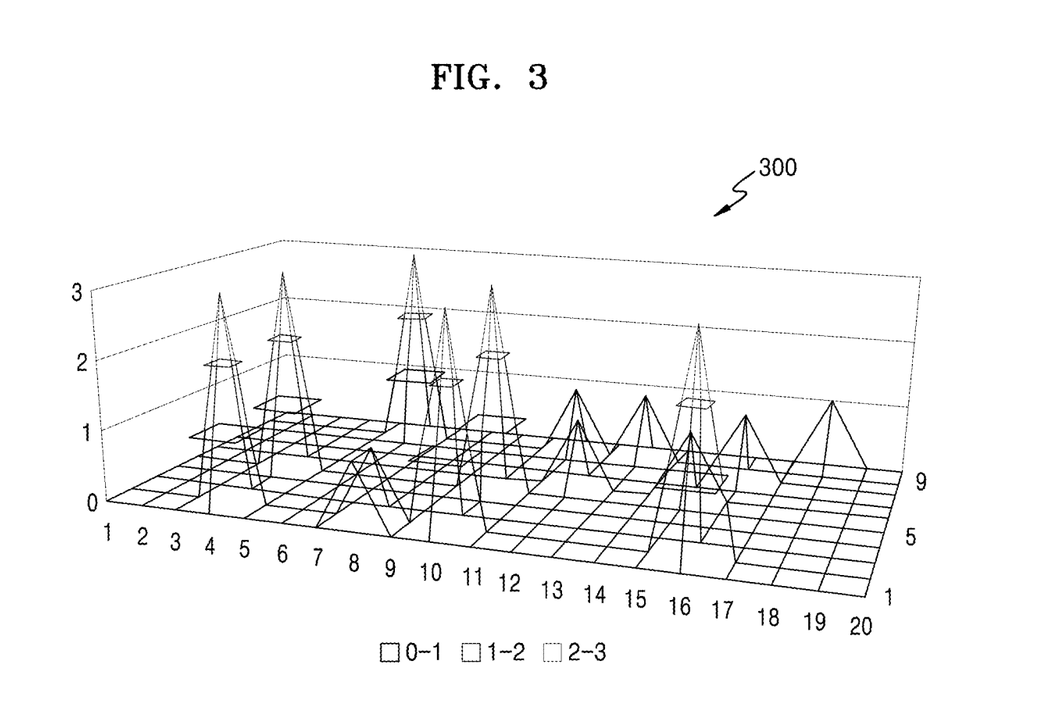
FIGS. 3 and 4 show locations of regions including employee circulation paths in a power block of a power plant, according to exemplary embodiments of the disclosure.
Figure 4:
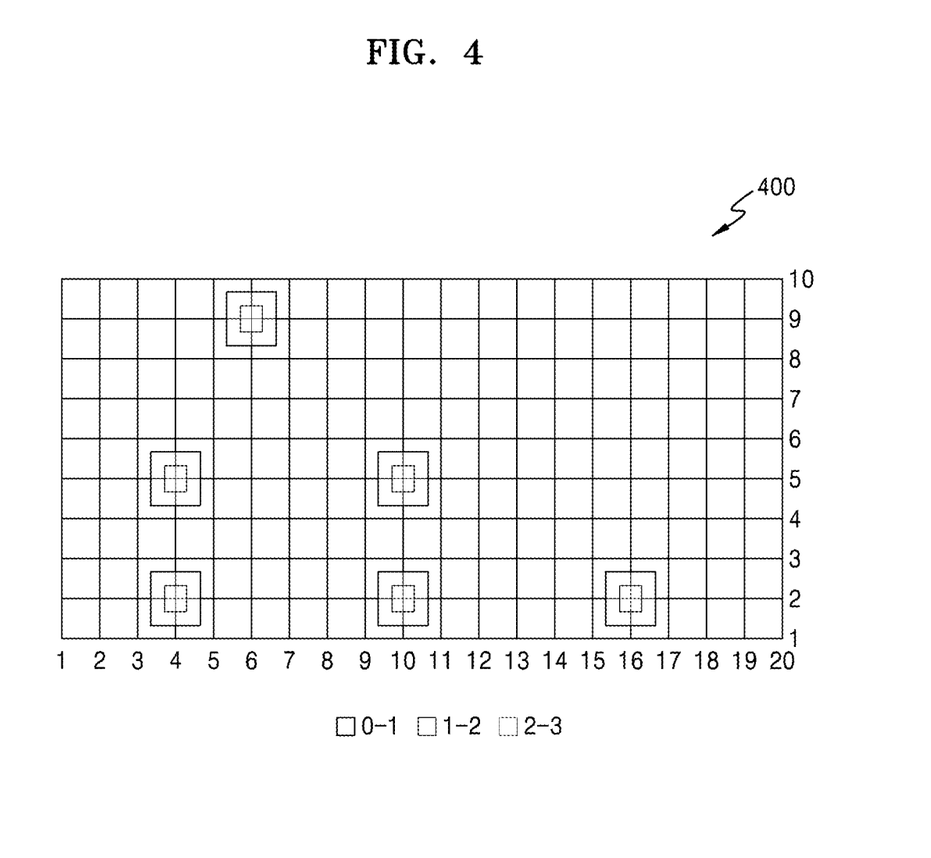

The total power plant control system 100 may perform a locating operation based on a beacon or a QR code mounted at an employee's moving path in the power plant requiring monitoring and controlling, as illustrated in an embodiment of FIG. 3 or 4.

A beacon is a short-range data communication technique based on Bluetooth low energy (BLE) and a technique to identify a location of an object. A beacon may communicate with devices within maximum 70 m, detect distances of devices within 49 m, and accurately locate the devices by an error range of about 5 cm. According to an exemplary embodiment of the disclosure, locating may be performed based on a signal read from a beacon signal or a QR code, by converting the signal read from the beacon signal or the QR code into a virtual GPS signal or by using other indoor three-dimensional locating signal recognition method.

The power plant control terminal 110 may include a cellular phone, a smart phone, a smart television (TV), a tablet, a laptop, a personal computer (PC), a hand-held device, a wearable device, a robot, etc., and may include a camera, a position sensor, and an augmented reality (AR) module for realizing AR. The AR module may communicate with the position sensor in the power plant control terminal 110 and when a user rotates a device in a desired direction, the AR module may look for corresponding information and display, on a display 116, new information shown through a camera.

The at least one server 120 may include a distributed control and monitoring system (DCS) server 121, a material and asset management and constructional management server 123, an auxiliary system power line controlling (PLC) server 125, an OLE for process control (OPC) server 127, a web server 129, etc., and may include a firewall 128, etc. to secure security during server communication. The total power plant control system 100 may communicate with main controlling systems through the OPC server 127 and with the material and asset management and constructional management server 123, the auxiliary system PLC server 125, etc. used in the power plant, through the Open application programming interface (API).

Also, the web server 129 may perform monitoring and control functions for an important process, by including a hardware interface function in addition to the OPC server 127. By applying controlling system hardware, analog input (AI), analog output (AO), digital input (DI), and digital output (DO) signals with respect to an important signal may be connected with a DCS and AR.

The at least one server 120 may synchronize, store, and manage data generated by the at least one server 120 through communication with a private cloud 130. Also, the at least one server 120 may provide the corresponding data to the power plant control terminal 110 via networks, such as private LET or internal Wi-fi networks.

According to an exemplary embodiment of the disclosure, the total power plant control system 100 may be established separately from the wireless network for GPS signals and smart phones. Thus, when inconsistency occurs to graphics or position information displayed on the power plant control terminal 110 used by the user, when the user mounts a location beacon in a power plant site or a device information beacon at a device and a system, the user may directly correct or alter the data via the display 116 of the power plant control terminal 110 and may input data. In this case, the history of the data that is input by the user, or of the data corrected or altered may be recorded in the at least one server 120 for tracking management thereof.

According to another exemplary embodiment of the disclosure, the total power plant control system 100 may record and manage location information of a user in real time, and thus, the information may be used for big data analysis with the traffic line analysis for maintenance and the identification of a frequent visiting location for each user.

According to another exemplary embodiment of the disclosure, the total power plant control system 100 may provide work orders via the display 116 of the power plant control terminal 110 used by a user. For example, in the case of a device requiring maintenance, when a manager marks the device to which an operator has to get, the operator may easily move to the corresponding location via AR. Thus, for equipment requiring consumables, consumable replacement information, etc., may be identified during site surveillance. Also, related information may be displayed in connection with the material and asset management and constructional management server 123, etc.

Hereinafter, an embodiment will be described, according to which the total power plant control system 100 may accurately identify a location of a user by using a beacon signal or a QR code, and provide information about a device in a power plant, the device being within a certain radius from the identified location of the user, for controlling the device.

The total power plant control system 100 may track a location of a user in an environment, such as a power block of a power plant, etc., which is surrounded by iron machines, etc., by using a beacon or a QR code, the beacon or the QR code being mounted in a people's traffic path in the power plant requiring monitoring and controlling. The power plant may include a power block, a device, a pipe, or the like, for which monitoring and controlling are required.

Actually, the power block in the power plant may include several floors and a people's traffic path is limited. Thus, when beacons are mounted around the ground at an interval of 5 to 10 m or mounted at an interval of 1 to 2 m only at a region for which accuracy is required, and several beacons are mounted at the top to identify the corresponding floor, all locations 300 and 400 of the region in which people may move around in the power block may be identified in real time, as illustrated in the embodiment of FIG. 3 or 4.

Figure 5:
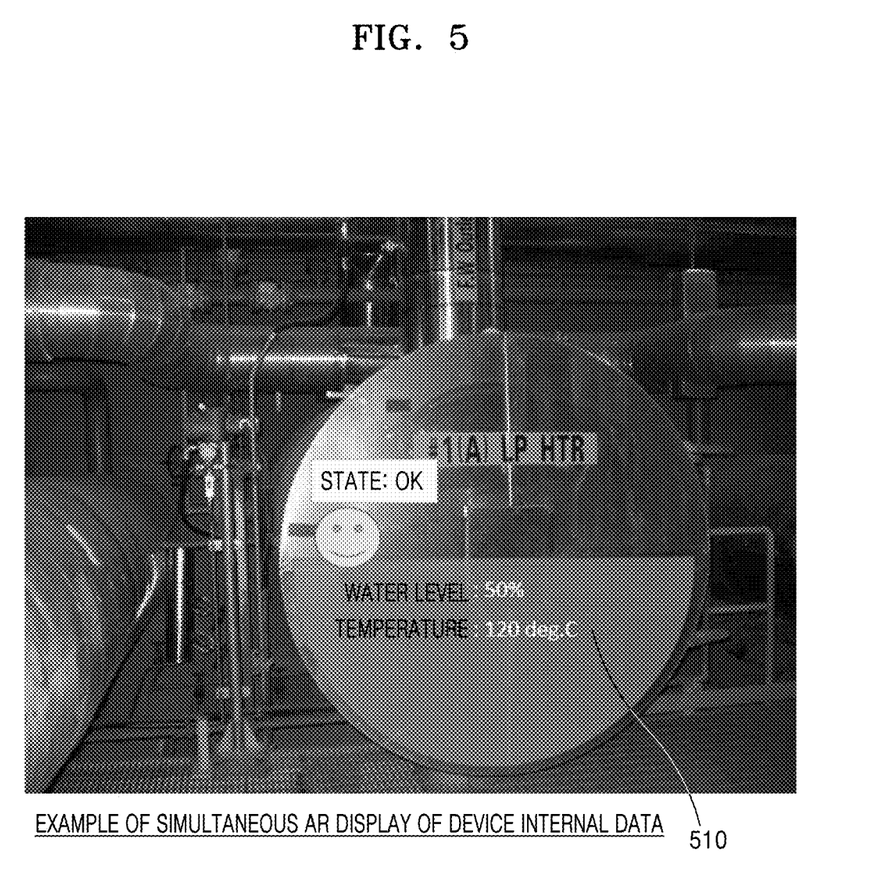
FIGS. 5 through 9 show an example of providing information about a situation in a power plant requiring monitoring and controlling via augmented reality (AR) by using a beacon or a QR code, according to exemplary embodiments of the disclosure.
Figure 6:
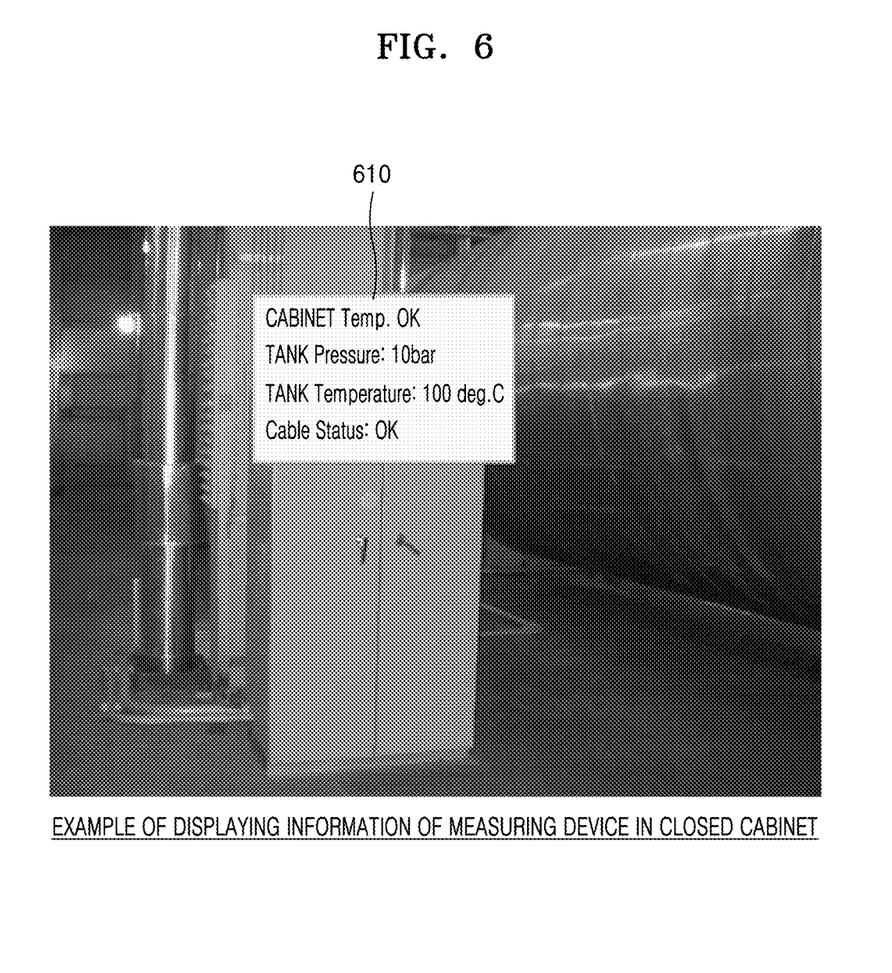

Also, the total power plant control system 100 may display device information 510 and 610 on the display 116 of the power plant control terminal 110 via AR as illustrated in FIGS. 5 and 6, based on a beacon signal received from a device information beacon arranged at a device or a pipe requiring monitoring and controlling.

According to an exemplary embodiment of the disclosure, the power plant control terminal 110 may include a beacon signal receiver 112 and the display 116, and may selectively further include a QR code receiver 114.

According to another exemplary embodiment of the disclosure, the power plant control terminal 1110 may include the QR code receiver 114 and the display 116, and may selectively further include the beacon signal receiver 112.

The beacon signal receiver 112 may receive a beacon signal from a location beacon mounted in a region of a power plant area requiring monitoring and controlling, the region including an employee circulation path, or from the device information beacon mounted at a device requiring identification.

According to an exemplary embodiment of the disclosure, each location beacon is provided with a unique identification number and corresponds to a code indicating a building location in the power plant. Thus, when the identification number of the location beacon is recognized, a location of the user may be accurately identified. Also, based on the intensity of the beacon signal received from the location beacon, very accurate distance measurement is possible.

Figure 8:
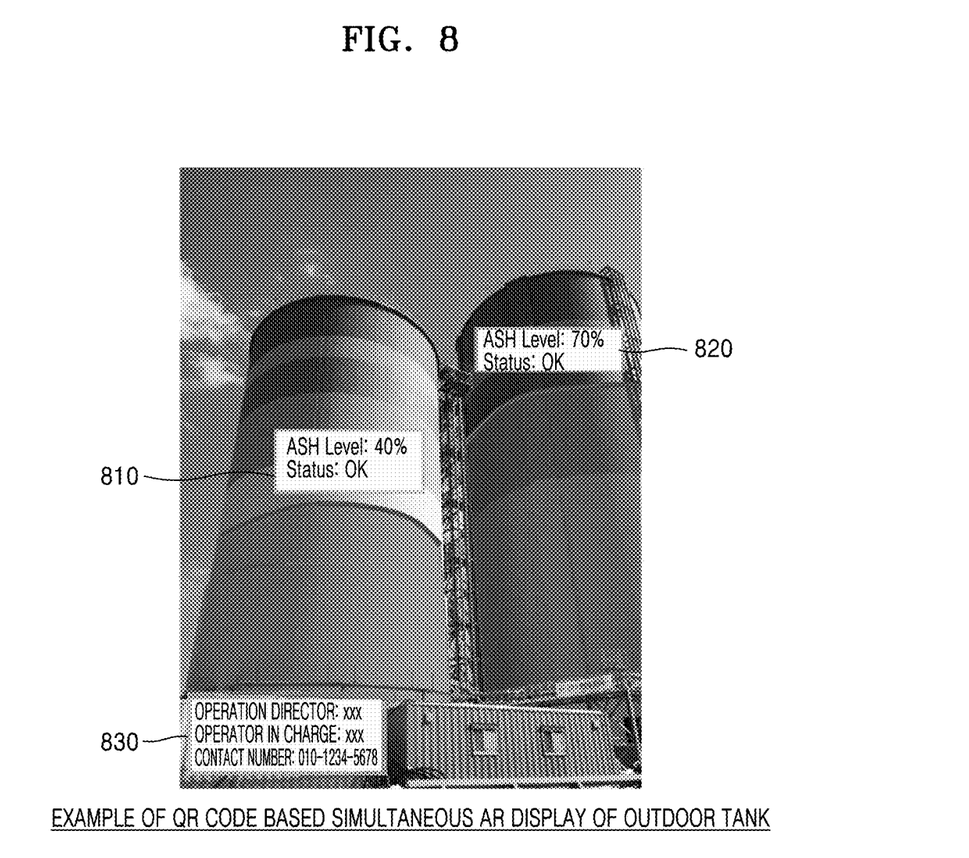

According to an exemplary embodiment of the disclosure, each device information beacon may include information about identification of a device, and information about a state, a history, or a maintenance plan of a device, wherein the information about the maintenance plan may further include information about consumable replacement. Beacon signal information received from the device information beacon may be communicated through the web server 129, etc., and when an identified device is clicked on via the display 116, information 510, 610, 810, 820, or 830 about the corresponding device may be shown as illustrated in FIGS. 5, 6, and 8, for monitoring and controlling. The information about the device 510, 610, 810, 820, or 830 may include text, numerals, images, data analysis information, etc.

FIG. 5 shows an example of device information 510, 511, and 512 overlaid on an heater image via the display 116, wherein the device information 510, 511, and 512 relate to information about a water level in a heater, information about a water temperature in the heater, and information as to whether the water level in the heater is within a pre-set normal range, according to an exemplary embodiment of the disclosure.

The device information 510, 511, and 512 may relate to the information about the water level in the heater, which is, for example, "water level: 50%," and the water temperature in the heater, which is, for example, "temperature: 120 deg. C." Also, when the water level of 30 to 50% in the heater and the water temperature of 100 to 150 deg. C in the heater are within the pre-set normal range, the device information 510, 511, and 512 may further include data analysis information 511 and 512 analyzing and determining whether the water level and the water temperature in the heater are within the normal range. The data analysis information 511 and 512 may be indicated as an image and text, respectively, which are intuitively identifiable.

FIG. 6 shows an example of information 610 about a plurality of devices included in an image, the information being displayed via the display 116, according to an exemplary embodiment of the disclosure.

Referring to FIG. 6, a cabinet 620 and a tank 630 are included in the image and the information 610 overlaid on the image may include information related to the plurality of devices 620 and 630. For example, information 611 may indicate that a temperature of the cabinet 620 is within a normal range, information 613 may indicate that a pressure of the tank 630 is 10 bar, information 615 may indicate that a temperature of the tank 630 is 100 deg. C, and information 617 may indicate that a state of the cabinet 620 that is arranged in a closed cable is normal.

Referring to FIG. 1 again, the display 116 may track a location of the beacon transmitting the beacon signal received by the beacon signal receiver 112, based on the received beacon signal. Also, the display 116 may display information about a device mounted within a pre-set radius from a location of a user that is identified in real time based on the beacon signal. Here, the display 116 may display the information about the device on a terminal of the user, two-dimensionally or three-dimensionally by using text or image. Also, the device information may be displayed via AR.

Figure 9:
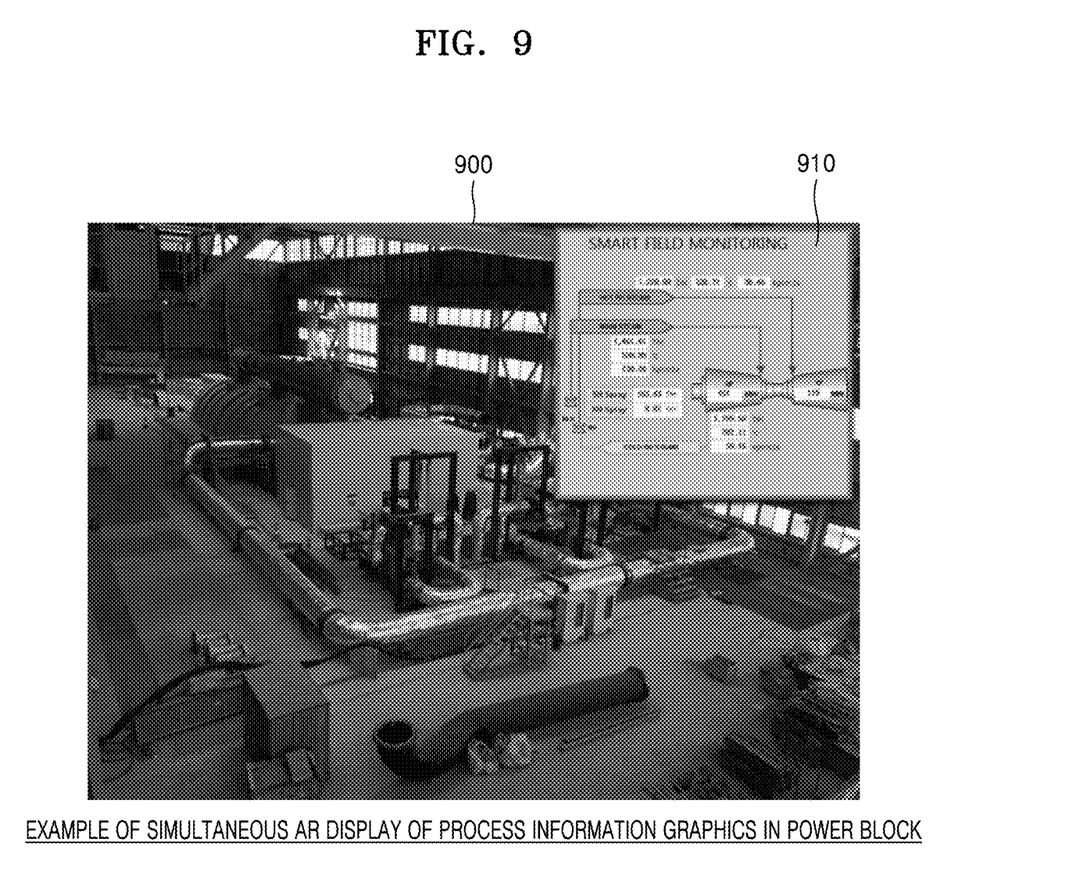

In this case, the display 116 may display the location of the user or the location of the device, the location being identified in a power block, and may display a screen obtained by a camera at a corresponding location, according to an exemplary embodiment of the disclosure of FIG. 9. Also, the display 116 may display, on a screen 900 obtained by the camera at a corresponding location, information 910 about a device and a process within a pre-set radius in an overlapping way via AR.

According to exemplary embodiments of the disclosure illustrated in FIGS. 5 through 9, site monitoring is possible via AR, and thus, actual devices may be identified with the naked eye to identify control system data. Accordingly, the power plant site monitoring may have greater efficiency than power plant site monitoring via virtual reality (VR).

According to another exemplary embodiment of the disclosure, the OR code receiver 114 may receive a OR code for identifying a location of a user or a device or system. A location at which the OR code is obtained, in the power plant or at the outside of the power plant, may be considered as the location of the user.

Figure 11:
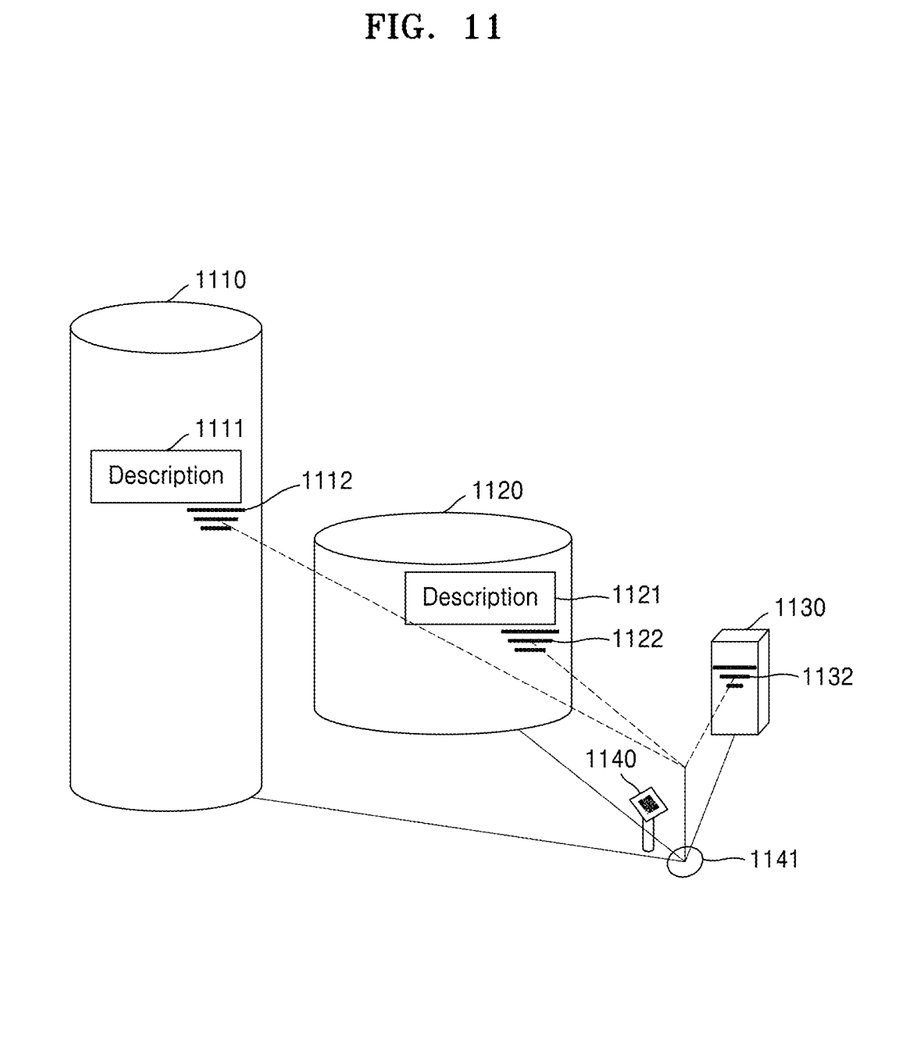
FIG. 11 shows an example of controlling a power plant by using a QR code, according to an exemplary embodiment of the disclosure.

Referring to an embodiment of FIG. 11, the OR code receiver 114 (FIG. 1) may consider a location at which a QR code 1140 is captured as a location 1141 of the user. The display 116 (FIG. 1) may form AR images 1111, 1112, 1121, 1122, 1130, and 1132 providing information about devices 1110, 1120, and 1130 peripheral to the corresponding considered user location and state information of the devices 1110, 1120, and 1130.

Figure 7:
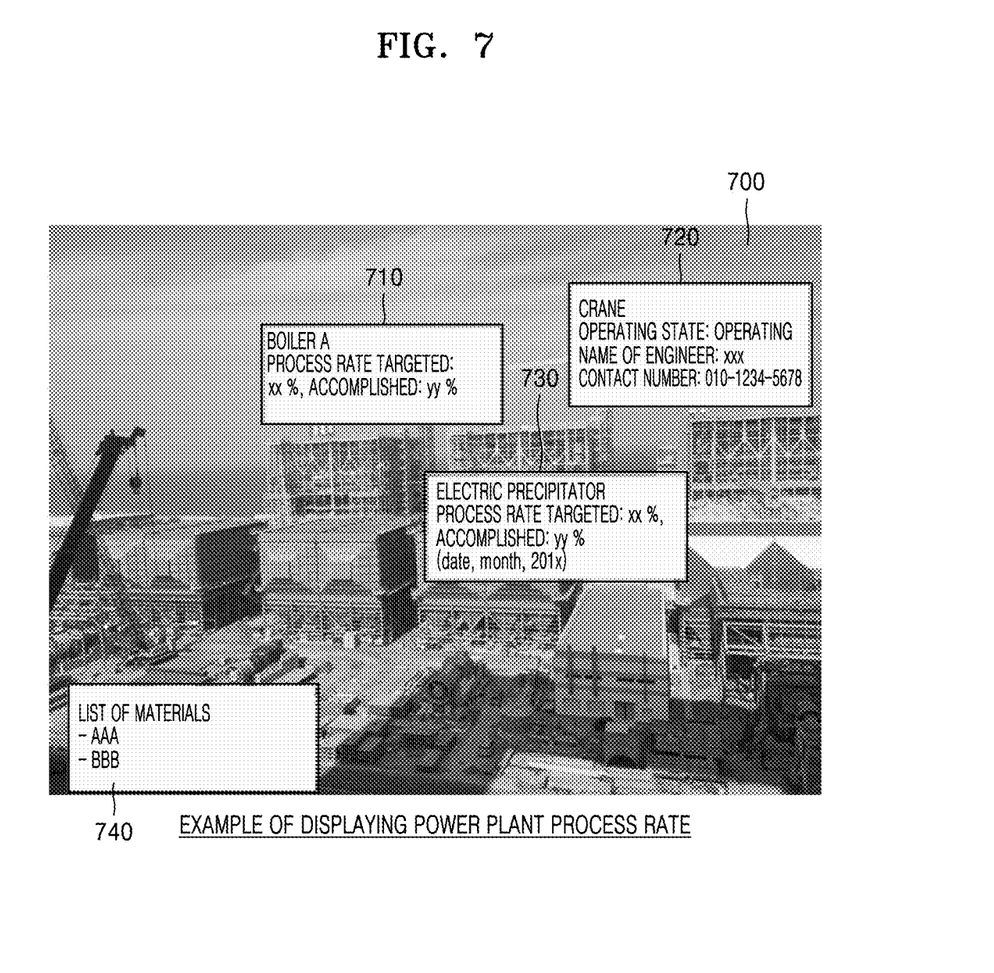

Referring to the embodiment illustrated in FIG. 7, Devices in the power plant or at the outside of the power plant may frequently be larger than a human being, and in this case, just by capturing a QR code at a specific location in a standing position, accurate location information may be identified without error, so that information 700, 710, 720, 730, and 740 about an environment surrounding a location at which the QR code is captured may be identified via AR.

In FIG. 7, the information 710, 720, 730, and 740 about the environment surrounding the location may be displayed, in an overlaid fashion, on an image captured based on a location or information detected from a device mounted around the captured location.

Figure 2:
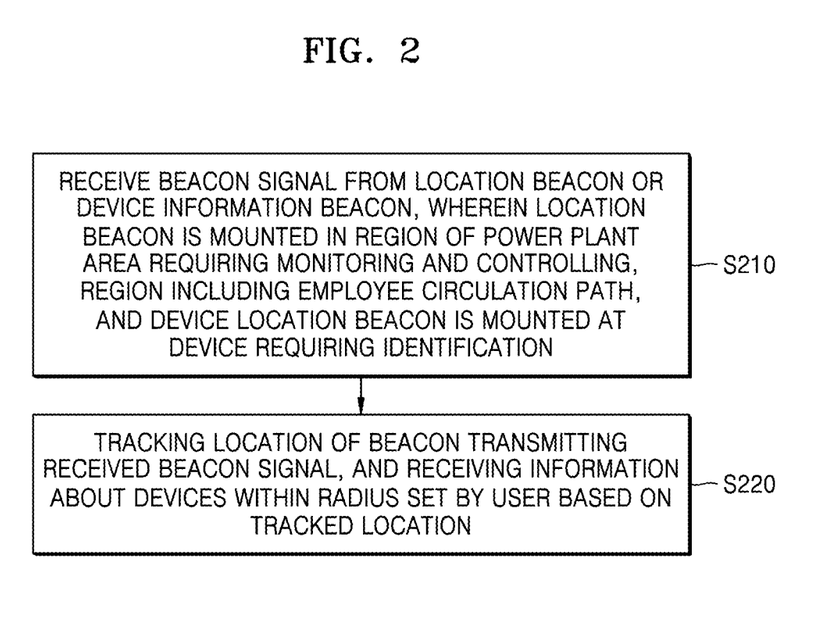
FIG. 2 is a flowcharts of a power plant controlling method, according to exemplary embodiments of the disclosure.

FIG. 2 is a flowchart of a power plant controlling method, according to an exemplary embodiment of the disclosure.

A receiver of a power plant control terminal may receive (S210) a beacon signal from a location beacon or a device information beacon, wherein the location beacon is mounted in a region of the power plant area requiring monitoring and controlling, the region including an employee circulation path, and the device information beacon is mounted at a device for which identification is required. Also, a location of each beacon from which the beacon signal is received may be tracked, and based on the tracked location, information about devices within a radius set by a user may be received in real time (S220) and may be displayed on a display as a combination of at least one of a two-dimensional form, a three-dimensional form, or an AR form.

Figure 12:
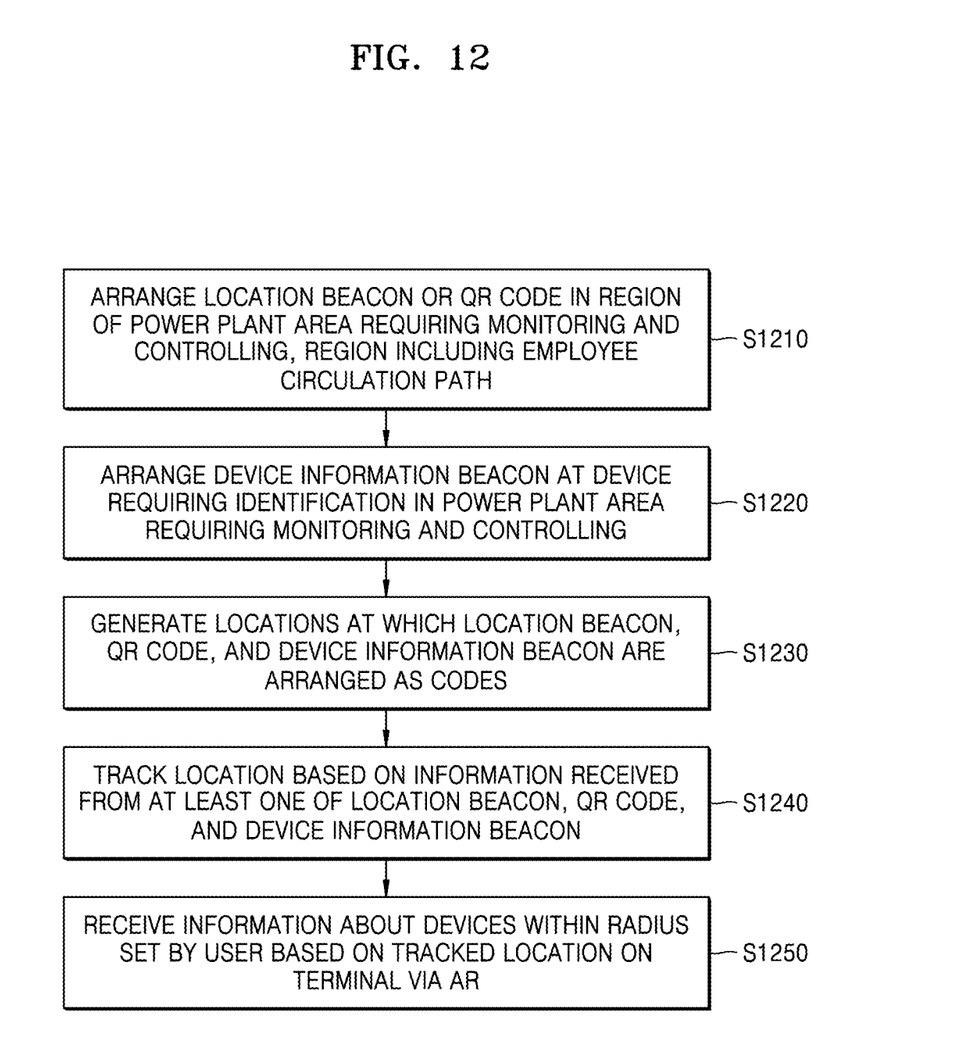
FIG. 12 is a flowchart of a power plant controlling method, according to another exemplary embodiment of the disclosure.

FIG. 12 is a flowchart of a power plant controlling method, according to another exemplary embodiment of the disclosure.

In a total power plant control system, a location beacon or a QR code is arranged (S1210) in a region in a power plant area requiring monitoring and controlling, the region including an employee circulation path, as illustrated in FIGS. 3 and 4. Also, a device information beacon is arranged (S1220) at a device for which identification is required, in the power plant area requiring monitoring and controlling. In this case, the beacons are fixed by using a non-steel material such as plastic, etc. for preventing interference with steel.

Also, as shown in the embodiment illustrated in FIG. 5, the locations at which the location beacon, the QR code, and the device information beacon are arranged are generated as codes (S1230). In this case, the generated codes may be matched with location codes used in the view for identifying device locations in the whole power plant area when designing the power plant.

The control terminal may identify (S1240) a location of a user or a location of a device based on information received from at least one of the location beacon, the QR code, and the device information beacon. When a plurality of users holding control terminals move around in the power plant, the total control system may further provide moving path information of other users to the control terminal used by each user.

Thereafter, the control terminals may receive information about devices within a radius set by the user based on the tracked location and display the information on the display via AG (S1250).

Figure 10:
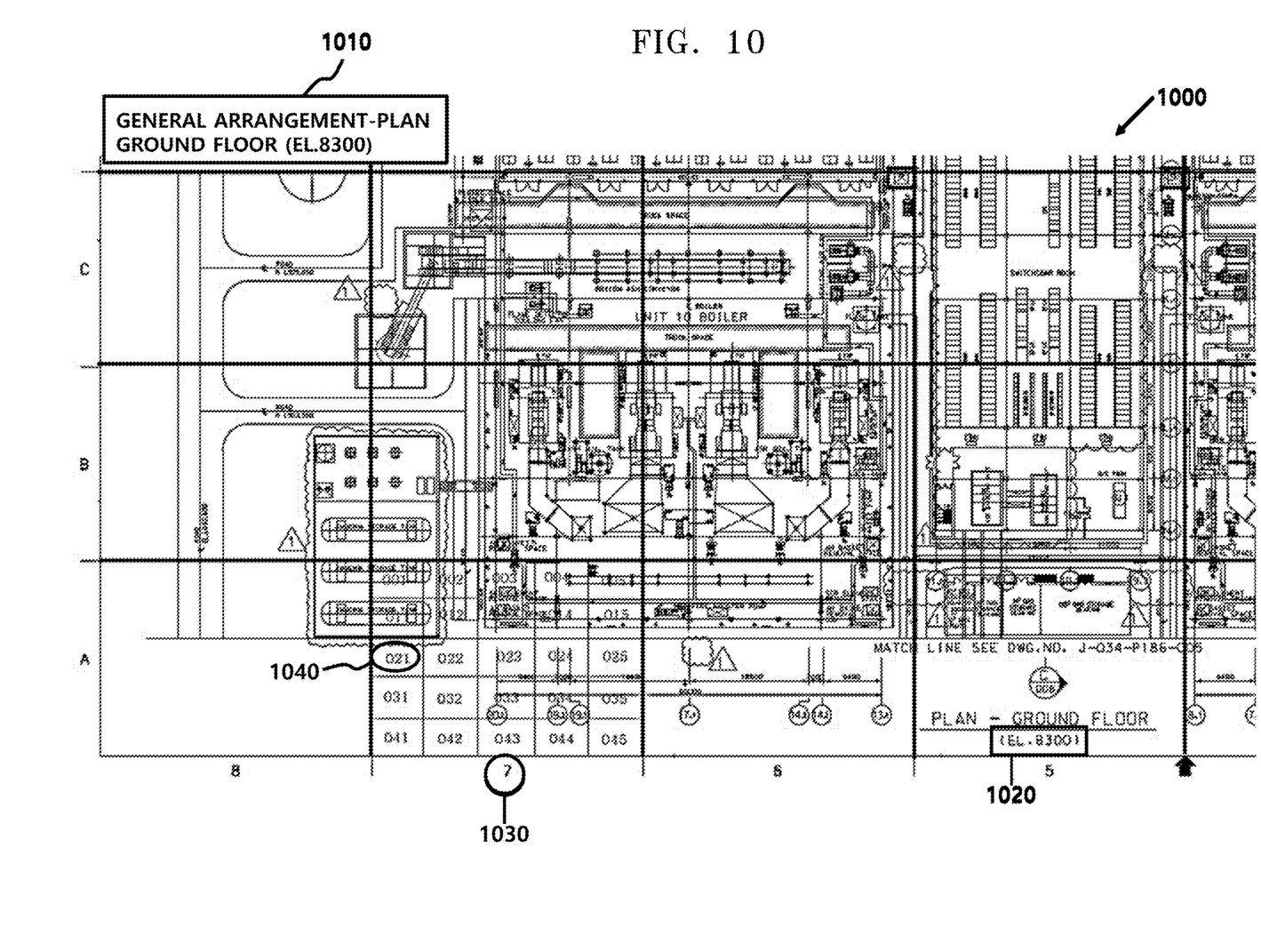
FIG. 10 shows an example of generating, in connection with a view of a power plant, a location at which a beacon or a QR code is arranged as a code, according to an exemplary embodiment of the disclosure.

FIG. 10 shows an example of a code used by a control terminal, according to an exemplary embodiment of the disclosure.

According to an exemplary embodiment of the disclosure, the control terminal may generate locations at which a location beacon, a QR code, and a device information beacon are arranged as codes. In this case, the codes may include information 1010 of drawing types, such as a perspective view, a rear view, a front view, a side view, a general arrangement view, a plot plan view, etc., information 1020 of elevations of the locations at which the location beacon, the QR code, and information of directions in which the location beacon, the QR code, and the device information beacon are arranged, based on a the user.

Referring to FIG. 10, a detailed meaning of the code "GAPEL08300A7021-N" is shown in the table below.

TABLE 1

| Code | Description |
|---|---|
| GAP (FIG. 10, 1010) | An abbreviation of general arrangement plan ("Plan" denotes a view from a top direction and "section" denotes a view from a side direction.) |
| EL | Elevation |
| 08300 (FIG. 10, 1020) | Elevation (m), elevations of all device mounted in a power plant may be indicated by five-digit numbers. |
| A7 (FIG. 10, 1030) | Left and bottom numbers in the view |
| 021 (FIG. 10, 1040) | Specific location numbers |
| N | Indicating directions in which an operator (a user) look as North, South, East, and West in the case of the QR code, the direction to be recognized by the operator is just one, and thus, the direction may be pre-designated, and in the case of the beacon, the direction may be given by software by identifying a moving path of the operator. |

According to an exemplary embodiment of the disclosure, the location of the user may be intuitively identified in the view of the power plant by using a code, and in the case of a region in which beacons are not mounted, locations may be estimated based on a signal intensity of the beacons recognized in a surrounding area. For example, when the codes GAPEL08300A7021 and GAPEL08300A7023 are recognized as the same intensity and a signal of the code GAPEL08300A7021 is decreased and a signal of the code GAPEL08300A7023 is increased, it may be estimated that an operator may move in the east in the view.

The methods or algorithm operations described according to exemplary embodiments of the disclosure may be directly realized by using hardware, or via a software module executed by hardware, or via a combination hardware and software. The software module may be stored in random-access memory (RAM), read-only memory (ROM), erasable programmable ROM (EPROM), electrically erasable programmable ROM (EEPROM), flash memory, hard disk, detachable disk, CD-ROM, or other types of computer-readable recording media well known in the art.

A power plant control system according to an exemplary embodiment of the disclosure may enable real time identification of a situation in the power plant via AR, even in a location in which a GPS is not used.

A power plant control system according to an exemplary embodiment of the disclosure may establish a web server through a network integrating a main control system, a material management system, and a constructional management system, and may realize all information usable in a power plant via site AR, through the established web server. Also, all information required by site operators, such as, constructional information, operational information, control information, etc., may be directly displayed, via AR, on terminals used by the site operators, or directly input or corrected, via AR, by the site operators.

According to an exemplary embodiment of the disclosure, a site information provision method via AR used by a power plant control system may not require realization of additional device graphics, and thus, compared to a method using VR using the graphics, a lower expense may be required for the realization of the method.

In the case of site monitoring via VR, even when devices are actually damaged, when the damages are not sensed by a sensor, the damages may not be displayed in real time via graphics. However, according to the site monitoring via AR according to the disclosure, actual devices and control system data may be identified with the naked eye, and thus, more efficient monitoring of a power plant site may be performed than in the case of the site monitoring via VR.

According to an exemplary embodiment of the disclosure, in a power plant control system, work orders may be provided via AR to a terminal of site operators. For example, information such as "a mounting area of a new control panel," etc. may be directly recorded in a tablet PC and transmitted to a web server to be written in the web server, and thus, when, later, construction staff visit the site, they may not additionally need to find locations and may immediately use the location displayed via AR as mounting information, which leads to increased convenience.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A power plant controlling method comprising:
receiving a beacon signal by a beacon signal receiver from a location beacon or a device information beacon, wherein the location beacon is mounted in a region of a power plant area requiring monitoring and controlling, the region including an employee circulation path, and the device information beacon is mounted at a device requiring identification;
tracking a location of the beacon transmitting the received beacon signal; and
receiving information about devices within a radius set by a user based on the tracked location via augmented reality (AR),
wherein the user directly alters a short-range data received from the beacon signal receiver and input data when inconsistency occurs to graphics or position information displayed on a terminal, and
wherein the power plant controlling method is separate from a method of controlling wireless network for GPS signals and smartphones.

2. The method of claim 1, wherein the receiving of the information comprises receiving, in real time, the information about the devices within the radius set by the user, wherein the information is displayed on the terminal of the user, and
information received from the beacon signal received from the device information beacon includes consumable replacement request information.

3. The method of claim 1, wherein the location beacon is used for identifying a location and has unique identification information, wherein the unique identification information includes information of a code indicating a location of a building in the power plant.

4. The method of claim 1, wherein the device information beacon includes identification information about a device, and information about a state, a history, or maintenance plan of the device, wherein the information about the maintenance plan of the device includes consumable replacement information.

5. The method of claim 1, wherein the receiving of the beacon signal comprises
receiving information about a QR code captured in the power plant area requiring monitoring and controlling.

6. The method of claim 5, wherein
a location at which the QR code is captured is regarded as a location of a user and the information about the devices within the radius set by the user, based on the regarded location of the user, is received via AR.

7. A non-transitory computer-readable recording medium having recorded thereon a program for executing the method of claim 1.

8. A power plant controlling method comprising:
arranging a location beacon or a QR code in a region of a power plant area requiring monitoring and controlling, the region including an employee circulation path;
arranging a device information beacon at a device requiring identification in the power plant area requiring monitoring and controlling;
generating locations at which the location beacon, the QR code, and the device information beacon are arranged as codes;
tracking a location of a user based on information received from at least one of the location beacon, the QR code, and the device information beacon; and
receiving, by a beacon signal receiver of a terminal, information about devices within a radius set by the user based on the tracked location, via augmented reality (AR), wherein the codes include information about a type of a view, information about elevations of the locations at which the location beacon, the QR code, and the device information beacon are arranged, and information about directions in which the location beacon, the QR code, and the device information beacon are arranged, based on the tracked location of the user,
wherein the user directly alters a short-range data received from the beacon signal receiver and input data when inconsistency occurs to graphics or position information displayed on the terminal, and
wherein the power plant controlling method is separate from a method of controlling wireless network for GPS signals and smartphones.

9. The method of claim 8, wherein
the location of the user in a region of the power plant area requiring monitoring and controlling, the location beacon or the QR code not being arranged in the region, is estimated based on an amplitude of a beacon signal transmitted from the region in which the location beacon is arranged.

10. A power plant controlling terminal comprising:
a beacon signal receiver configured to receive a beacon signal from a location beacon or a device information beacon, wherein the location beacon is mounted in a region of a power plant area requiring monitoring and controlling, the region including an employee circulation path, and the device information beacon is mounted at a device requiring identification; and
a display configured to track a location of the beacon transmitting the received beacon signal and display information about devices within a radius set by a user based on the tracked location via augmented reality (AR), wherein the user directly alters a short-range data received from the beacon signal receiver and input data when inconsistency occurs to graphics or position information displayed on the power plant controlling terminal, and wherein the method implemented by the power plant controlling terminal is a separate method from controlling wireless network for GPS signals and smartphones.

11. The power plant controlling terminal of claim 10, wherein, when a plurality of users is in the power plant area requiring monitoring and controlling, a moving path of each of the plurality of users is tracked based on the location of the beacon and the moving paths of other users are interactively identified with respect to the plurality of users.

* * * * *